United States Patent

Shinada

Patent Number: 5,477,374
Date of Patent: Dec. 19, 1995

[54] OPTICAL BEAM SCANNING APPARATUS

[75] Inventor: Hidetoshi Shinada, Kanagawa, Japan

[73] Assignee: Fuji Photo Film Co., Ltd., Kanagawa, Japan

[21] Appl. No.: 125,668

[22] Filed: Sep. 23, 1993

[30] Foreign Application Priority Data

Oct. 5, 1992 [JP] Japan ................................. 4-266073

[51] Int. Cl.⁶ ................................................ G02B 26/08
[52] U.S. Cl. ...................... 359/216; 359/202; 359/214; 250/236
[58] Field of Search ............................. 359/201–202, 359/206–210, 212–221, 285–287, 305; 250/234–236; 346/108, 109; 358/296, 302, 474, 494; 369/112

[56] References Cited

U.S. PATENT DOCUMENTS

| 4,827,125 | 2/1989 | Goldstein | 250/234 |
| 4,862,196 | 8/1989 | Umeda et al. | 346/108 |

FOREIGN PATENT DOCUMENTS

| 53-9856 | 4/1978 | Japan. |
| 54-5455 | 1/1979 | Japan. |
| 55-29414 | 2/1980 | Japan. |
| 57-41618 | 3/1982 | Japan. |
| 63-5741 | 2/1988 | Japan. |

Primary Examiner—Paul M. Dzierzynski
Assistant Examiner—James Phan
Attorney, Agent, or Firm—Sughrue, Mion, Zinn, Macpeak & Seas; Richard C. Turner; Peter A. McKenna

[57] ABSTRACT

An optical beam scanning apparatus which includes: an optical modulator which emits an optical beam in a direction corresponding to the frequency of an inputted signal; scanning device for scanning the optical beam; a scanning lens; a storage device which stores data for correcting the displacement of the optical beam passing through the scanning lens caused by an aberration of the scanning lens for each scanning position of the optical beam; and a device which, based on the data stored in the storage device, alters the frequency of the signal to be inputted to the optical modulator for each scanning position of the optical beam so as to correct the displacement of the optical beam caused by the aberration of the scanning lens.

11 Claims, 12 Drawing Sheets

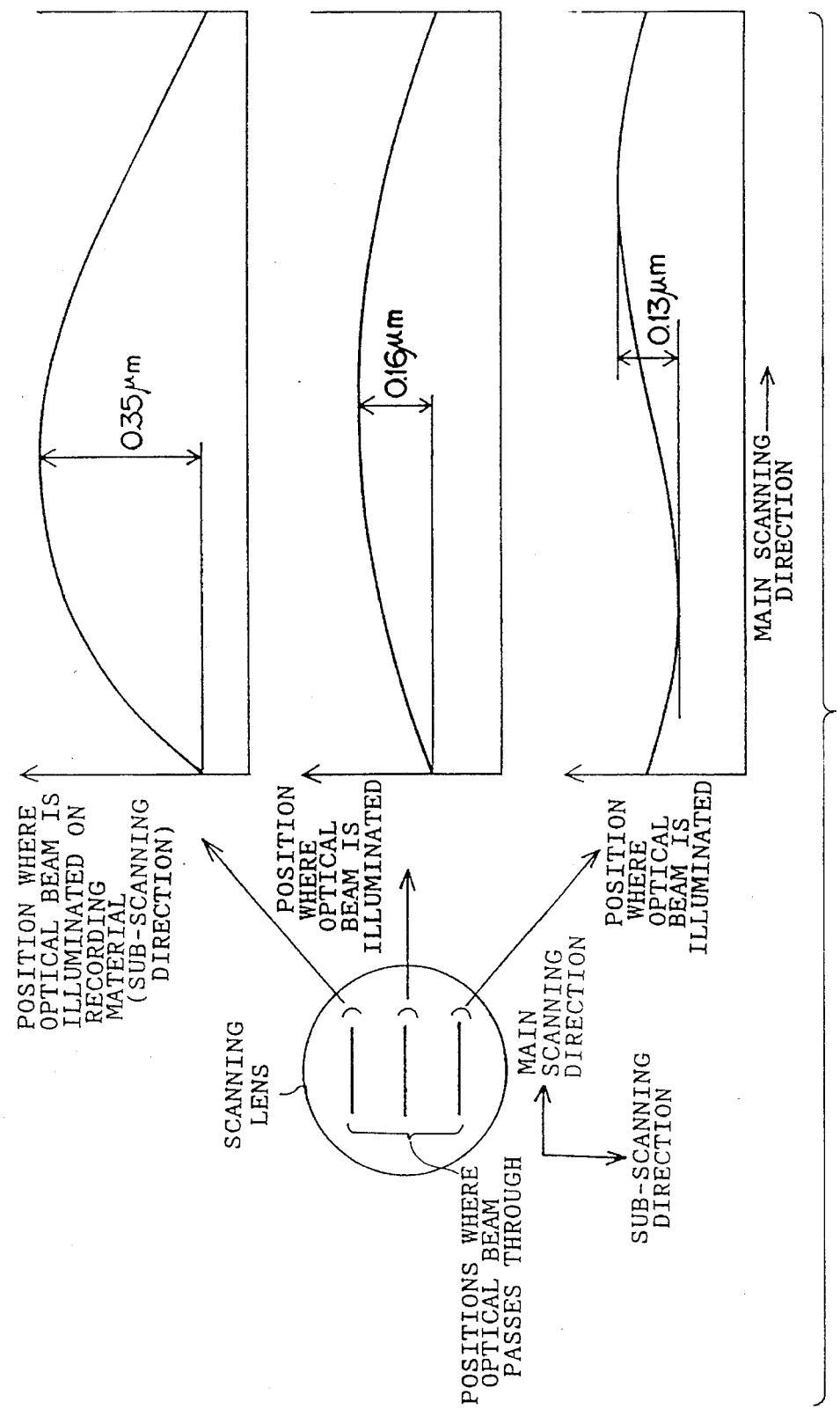

OPTICAL BEAM SCANNING APPARATUS

BACKGROUND OF THE INVENTION

1. Field of the Invention

The present invention relates to an optical beam scanning apparatus, which is used in a laser beam recording apparatus or the like.

2. Description of the Related Art

Conventionally, there has been proposed an optical beam scanning apparatus, which allows stable and rapid reading or recording of an image, realized by using a plurality of optical beams formed by an optical modulating apparatus providing a multi-frequency acoustic optical element (AOM) (see, for example, Japanese Patent Publication No. 63-5741, Japanese Patent Laid-Open Nos. 54-5455 and 57-41618, Japanese Patent Publication No. 53-9856, Japanese Utility Model Laid-Open No. 55-29414 and the like). In an optical beam scanning apparatus such as an optical beam recording apparatus or the like, in which an image is recorded using such an acoustic optical element, a plurality of oscillating circuits generates a plurality of high frequency signals having different frequencies. The generated high frequency signals are, in accordance with an image to be recorded, turned on or off so as to be mixed. The resultant signals are supplied to the AOM to drive it.

Accordingly, the AOM oscillates in accordance with the supplied high frequency signals and an optical beam incident on the AOM is diffracted in a direction corresponding to the frequency of the high frequency signals and by strength in accordance with the amplitude of the high frequency signals, so that a plurality of optical beams is emitted from the AOM. Scanning of the plurality of optical beams emitted from the AOM is carried out along a main scanning direction by means of an optical scanning system which comprises a rotating polygon mirror and the like, so that the optical beams are illuminated onto a recording material through a lens (scanning lens) which adjusts the scanned optical beams. A position in which an optical beam is illuminated is moved along a sub-scanning direction by conveying the recording material or by scanning an optical beam in the sub-scanning direction by means of a scanning means such as a galvanometer and the like. As a result, the optical beam illumination position moves two-dimensionally on the recording material so that an image is recorded thereon.

On the other hand, an optical beam which has passed through a scanning lens is displaced somewhat with respect to the position in which the optical beam is illuminated on the recording material due to an aberration of a scanning lens. The amount of displacement of the optical beam illumination position varies in accordance with the position in which the optical beam passes through the scanning lens. Accordingly, the line of motion of the position in which the optical beam scanned along the main scanning direction by means of an optical scanning system and illuminated on the recording material through the scanning lens curves with respect to the main scanning direction as illustrated in FIG. 12. Further, the optical beam represents different amounts and shapes of curvature in accordance with the position on the scanning lens in which the optical beam is scanned. i.e., the position in which the optical beam passes through (see FIG. 12).

Therefore, when an image is recorded by scanning a plurality of optical beams simultaneously, since scanning lines recorded by the respective optical beam are different from each other in their curved shapes, the intervals between scanning lines become non-uniform, thereby resulting in an unevenness in the image. Especially, when the intervals between scanning lines to be simultaneously recorded by a plurality of optical beams are widened to record the image by a so-called interlace, since the intervals between the positions on the scanning lens in which the respective optical beams are scanned become wide, these optical beams are greatly different from each other in their amounts and shapes of curvature. As a result, unevenness of the interval between the scanning lines to be recorded by the respective optical beams appears remarkably and periodically.

The unevenness of the interval of scanning lines especially becomes a problem when an image represented with dots which are very often employed in the field of printing is recorded. Namely, since the area of the dots represent image density, the dots must be recorded such that the area thereof accurately corresponds to the density. However, when there is the unevenness of the interval of scanning lines as explained above, the dot area varies so that the recorded image may be viewed as that which is different from the original one. Also, when the unevenness is periodically generated, there is an inconvenience in which the unevenness is excessively represented depending upon a relationship with respect to the interval of dots. Further recently in the field of printing, an image is recorded in high density by 600 to 700 scanning lines per inch. In this way, when an image is recorded at high density, the intervals between the scanning lines need to be made strictly uniform.

In addition, when an image is recorded by scanning one optical beam only in a main scanning direction and by conveying a recording material to carry out sub-scanning, since the optical beam scans a fixed position on a scanning lens, each scanning line has a uniform amount and shape of curvature so that the intervals between the scanning lines are substantially uniform. However, when an image is recorded in high density on, e.g., a microfilm and the like, using the above-described optical beam recording apparatus, the image recorded on a microfilm may be enlarged by high magnification. In this ease, even though the intervals between scanning lines are uniform, if a scanning line curves only by 0.1 µm, this curved portion is viewed as image distortion.

On the other hand, with relation to the above description, it has been known that an oscillator circuit which generates a signal to be inputted to an AOM is comprised of a voltage controlled oscillator (VCO) having a variable oscillating frequency in accordance with an applied voltage (Visibility and Correction of Periodic Interference Structures in Line-by-Line Recorded Images, Journal of Applied Photographic Engineering Volume 2, Number 2, Spring 1976). However, this technique disclosed in the above-described publication employs the VCO in order to correct an error with respect to a preset frequency and does not change the frequency of the VCO during scanning of optical beams.

SUMMARY OF THE INVENTION

In view of the aforementioned facts, it is an object of the present invention to provide an optical beam scanning apparatus, which can eliminate the influence of aberration of a scanning lens.

According to a first aspect of the present invention, an optical beam scanning apparatus is provided which comprises: an optical modulator which emits an incident optical beam in a direction corresponding to a frequency of an input signal; scanning means which scans the optical beam emitted from the optical modulator; a scanning lens in which the optical beam scanned by the scanning means passes through;

storage means for storing data for correcting displacement of the optical beam passing through the scanning lens, which is caused by an aberration of the scanning lens, for each scanning position; and alteration means for altering, based on the data stored in the storage means, the frequency of the signal to be inputted to said optical modulator for each scanning position of the optical beam so as to correct the displacement of the optical beam caused by the aberration of the scanning lens.

The scanning means is capable of scanning the optical beam along a main scanning direction or a sub-scanning direction. Information for correcting the displacement, e.g., the displacement amount of optical beam, is previously measured and correction amount of the frequency of a signal for correcting the displacement is obtained, so that the correction amount may be stored. In this case, the alteration means may, in accordance with the stored correction amount, alter the frequency of a signal depending upon the position of the optical beam along the main scanning direction. Further, by way of example, the displacement amount of a previously-measured optical beam is stored, so that, based on the stored displacement amount, the correction amount may be obtained in the alteration means by calculation.

Accordingly, the frequency of the signal inputted to the optical modulator is altered in accordance with a position on the scanning lens where the optical beam passes through, which varies as the optical beam is scanned, and a direction where the optical beam is emitted from the optical modulator changes successively so that the displacement of the optical beam is corrected. Therefore, when this optical beam is illuminated on, e.g., a recording material, the line of motion of the position in which the optical beam is illuminated substantially coincides with the main scanning direction. As a result the influence of aberration of the scanning lens is eliminated.

In the present invention, for example, when an image is recorded by an optical beam the position in which the optical beam is illuminated on the recording material must be moved along a sub-scanning direction. This movement along the sub-scanning direction is carried out only by moving the recording material or by scanning the optical beam along the main scanning direction and the sub-scanning direction by means of the scanning means. When the optical beam is scanned by the scanning means along the main scanning direction and the sub-scanning direction, the position on the scanning lens, in which the optical beam is scanned, will be moved along the sub-scanning direction and the displacement amount of the optical beam varies along the sub-scanning direction.

According to a second aspect of the present invention, an optical beam scanning apparatus is provided which comprises: an optical modulator which emits an incident optical beam in a direction corresponding to a frequency of an input signal; scanning means which scans the optical beam emitted from the optical modulator along a main scanning direction; a scanning lens in which the optical beam scanned by the scanning means passes through; a detector for detecting displacement amount of the optical beam caused by an aberration of the scanning lens; and alteration means for altering the frequency of the signal to be inputted to the optical modulator so as to correct the displacement amount of the optical beam, which is detected by the detector.

The direction in which the optical beam is emitted from the optical modulator changes successively so as to correct the displacement of the optical beam, thereby eliminating the influence of the aberration of time scanning lens. Meanwhile, when a laser beam which is emitted from, e.g., a gas laser, is used as the optical beam of the present invention, the position where the laser beam is illuminated may vary with environmental variation (e.g., temperature), power supply variation, and time like. According to the second aspect of the present invention, the displacement of the laser beam caused by such environmental variation or the like can be corrected simultaneously.

According to a third aspect of the present invention, a laser beam recording apparatus is provided which comprises: a laser light source; an optical modulator which emits an incident optical beam in a direction corresponding to a frequency of an input signal; scanning means which scans the optical beam emitted from the optical modulator along a main scanning direction; a stage for supporting a recording medium onto which the optical beam is illuminated; a scanning lens for illuminating the optical beam scanned by the scanning means onto the recording medium on said stage; a storage device which stores data for correcting displacement of the optical beam caused by an aberration of the scanning lens such that the data corresponds to an position in which the optical beam is illuminated along the main scanning direction; and alteration means for altering, based on the data stored in the storage device, the frequency of the signal to be inputted to the optical modulator for each position in which the optical beam is illuminated along the main scanning direction so as to correct the displacement of the optical beam caused by an aberration of the scanning lens.

In the present laser beam recording apparatus, a plurality of scanning lenses having different magnification may be provided and any of them which has proper magnification in accordance with the size of an image to be recorded, and the like may be selected for use. When this alteration of scanning lens is carried out, a relationship between a position on the scanning lens in which the optical beam passes through and the displacement amount of the optical beam varies. According to the present invention, when the relationship between the position on the scanning lens in which the optical beam passes through and the displacement amount of the optical beam varies, by providing a control means in which information stored in the storage means is altered to the information corresponding to the varied relationship, the influence of aberration of the scanning lens can be eliminated even though the scanning lenses are changed.

BRIEF DESCRIPTION OF THE DRAWINGS

FIGS. 12 is diagrammatic view illustrating the curvature (displacement) of optical beams, which is caused by an aberration of a scanning lens.

DESCRIPTION OF THE PREFERRED EMBODIMENTS

Referring to the accompanying drawings, embodiments according to the present invention are hereinafter described in greater detail.

[First Embodiment]

Figure 1:
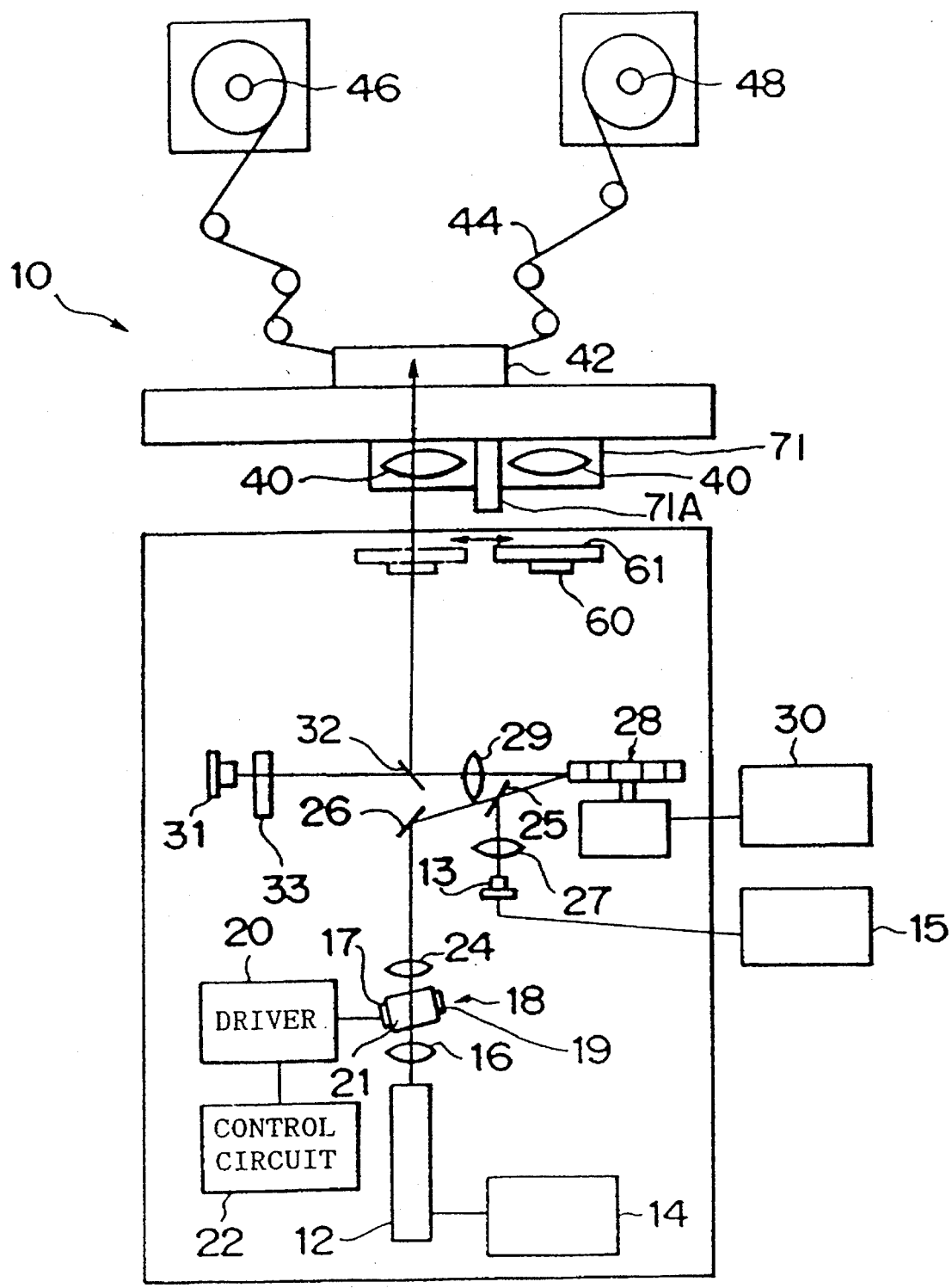
FIG. 1 is a schematic block diagram illustrating a laser beam recording apparatus according to a first embodiment of the present invention.

FIG. 1 illustrates a laser beam recording apparatus 10 according to the first embodiment. The laser beam recording apparatus 10 is provided with an He—Ne laser 12 connected to a power supply 14. In place of this He—Ne laser, other gas lasers or semiconductor lasers or the like may be used. At the side of the He—Ne laser 12 where the laser beam is emitted, a lens 16, AOM (acoustic optical element) 18 and a lens 24 are sequentially arranged. AOM 18 is provided with an acoustic optical medium 21 which produces an acoustic optical effect. On two respectively opposite surfaces of the acoustic optical medium 21, a transducer 17 for outputting a supersonic wave corresponding to the inputted high frequency signal and a sound absorbing material 19 for absorbing the supersonic wave propagating through the acoustic optical medium 21, are adhered. The transducer 17 is connected to an AOM driver 20 for driving AOM 18. The AOM driver 20 is in turn connected to a control circuit 22. In this embodiment, a laser beam which is incident into AOM 18 is divided into a maximum of eight laser beams and these laser beams are emitted as a recording laser beam.

On the side of the lens 24 where the laser beam is emitted, a mirror 26, dichroic mirror 25, polygon mirror (rotating polygon mirror) 28, lens 29, and a dichroic mirror 32 are sequentially arranged. In the vicinity of the dichroic mirror 25, a lens 27 and a semiconductor laser 13 are disposed. The semiconductor laser 13 is connected to and driven by a semiconductor laser driver 15. The semiconductor laser 13 which serves as a reference laser beam emits a laser beam whose wave length is longer than that of visible light. The laser beam emitted from the semiconductor laser 13, which serves as a reference laser beam, is incident via the lens 27 on the dichroic mirror 25. The dichroic mirror 25 is formed so that the light whose wavelength corresponds to the reference laser beam emitted from the semiconductor laser 13 is reflected back from and the remaining light of all other wavelength passes through the dichroic mirror 25. Accordingly, the recording laser beam incident on the dichroic mirror 25 passes through the dichroic mirror 25 and the reference laser beam is reflected off of the dichroic mirror 25, so that the respective laser beams are mixed together and are emitted in the same direction, i.e., toward a polygon mirror 28 side.

The polygon mirror 28 is connected to and is rotated at a high speed by the polygon mirror driver 30 to deflect the incident laser beam along a main scanning direction. The main scanning direction is perpendicular to the direction in which the laser beam is diffracted by the AOM. The polygon mirror driver 30 is provided with a number-of-revolution detecting means (not shown) for detecting the number of revolutions of the polygon mirror 28 so as to control the rotation of the polygon mirror 28 at a fixed speed. The recording laser beam and the reference laser beam both of which are reflected off of the polygon mirror 28 and are deflected along the main scanning direction are incident via the lens 29 on the dichroic mirror 32. The dichroic mirror 32 is formed so that the light whose wavelength corresponds to the recording laser beam is reflected off of and the remaining light of all other wavelengths passes through the dichroic mirror 32. Accordingly, the recording laser beam incident on the dichroic mirror 32 is reflected off thereof and the reference laser beam passes through the dichroic mirror 32 and in turn is divided into two laser beams.

A linear encoder 33 and a photoelectric converter 31 are sequentially arranged at a position where the reference laser beam, which passes through the dichroic mirror 32, can be received. Therefore, the reference laser beam which has passed through the dichroic mirror 32 is scanned on the linear encoder 33. The linear encoder 33 is formed with a planar plate in which multiple transparent portions and opaque portions are alternately disposed in the form of stripes with a constant pitch in the main scanning direction. When the linear encoder 33 is scanned by the reference laser beam reflected off of the polygon mirror 28, the reference laser beam, which has passed through the transparent portion, is photoelectrically converted by the photoelectric converter 31 to output a pulse signal. The pulse signal is constructed such that the number of pulses corresponds to the position of the reference laser beam on the main scanning line and the interval between each pulse corresponds to the main scanning rate of the reference laser beam.

On the side of the dichroic mirror 32 where the laser beam is reflected, a turret 71 and a stage 42 are sequentially arranged. The recording laser beam reflected off of the dichroic mirror 32 is illuminated on the stage 42 via a scanning lens 40 supported by the turret 71. A plurality of scanning lenses 40 having different magnification is supported by the turret 71. The turret 71 can be rotated around a shaft 71A. The rotation of the turret 71 allows any one of the plurality of scanning lenses 40 to be disposed on an optical path of the laser beam. Meanwhile, in the laser beam recording apparatus 10 of the first embodiment, since the laser beam is scanned only in the main scanning direction, each laser beam scans a fixed position on the scanning lens 40.

At the stage 42, a recording material 44 composed of photosensitive materials which are exposed to the light of a wavelength of a visible light region (e.g., a microfilm or the like) is disposed. Both ends of the recording material 44 are respectively wound in layers about reels 46 and 48. The recording material 44 is, with the laser beam illuminated thereon, conveyed by a conveying means (not shown) along the direction perpendicular to the scanning direction of the illuminated laser beam (main scanning direction), i.e., a sub-scanning direction. Accordingly, the position where the laser beam is illuminated moves two-dimensionally on the recording material 44 so that an image is recorded on the recording material 44.

Figure 2:
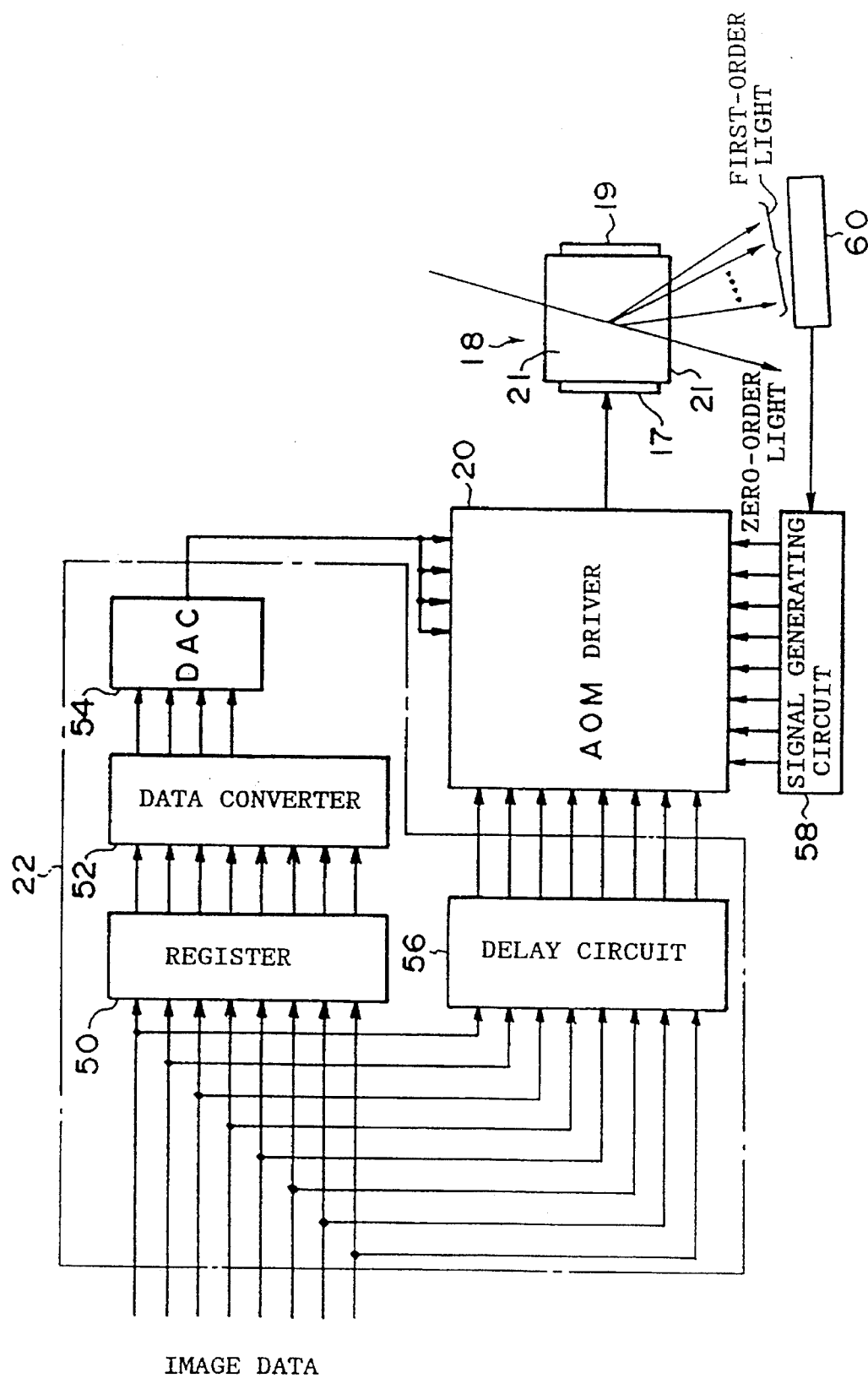
FIG. 2 is a block diagram illustrating the configuration of a control circuit and the connection between the control circuit and an AOM driver.

A shutter 61 is disposed between the dichroic mirror 32 and the scanning lens 40. The shutter 61 is closed so as to cut off the laser beam at the time of non-recording, e.g., when recording is passed from one frame to another frame, or when recording is passed from one fish to another fish. On the side of the shutter 61 where the laser beam is incident, a photoelectric converter 60 is mounted. As illustrated in FIG. 2, the photoelectric converter 60 is connected to a signal generating circuit 58. The signal generating circuit 58 is connected to an AOM driver 20 to output a signal which controls the amplitude of a high frequency signal which is supplied from the AOM driver 20 to the AOM 18.

The control circuit 22 illustrated on the left half side of the paper of FIG. 2 is provided with a register 50 for temporarily storing the image data and a data converter 52 connected thereto. This image data is given in the form of eight-bit parallel signal. The data converter 52 outputs a four-bit parallel signal corresponding to the number of turned-on eight-bit signals inputted from the register 50. A DAC (digital-analog converter) 54 is connected to the data converter 52. DAC 54 converts the four-bit parallel signal outputted from the data converter 52 into an analog signal for outputting to the AOM driver 20. The level of this analog signal becomes higher as the number of the turned-on signals becomes larger. In addition, after the image data is delayed at a delay circuit 56 for a predetermined period of time, it is inputted into the AOM driver 20.

Figure 3:
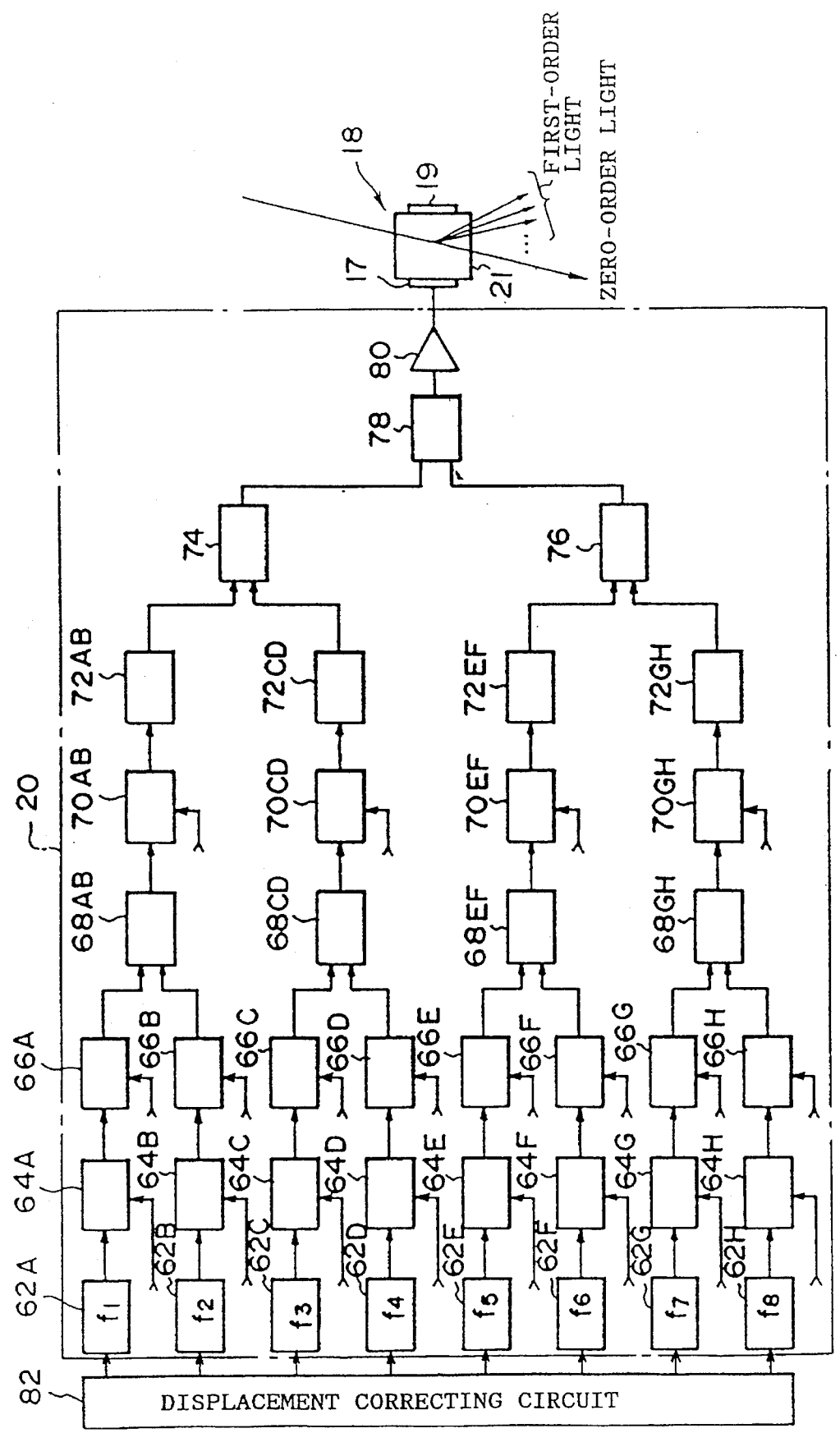
FIG. 3 is a block diagram illustrating the schematic configuration of the AOM driver.

As illustrated in FIG. 3, the AOM driver 20 is provided with oscillating circuits 62A, 62B, 62C, 62D, 62E, 62F, 62G, and 62H. The oscillating circuits 62A through 62H are each composed of a voltage controlled oscillator (VCO). The respective frequency controlling terminals thereof are connected to a displacement correcting circuit 82. The oscillating circuits 62A through 62H output high frequency signals each having a frequency corresponding to the voltage level of signals supplied through the frequency controlling terminals. Local level control circuits 64A, 64B, 64C, 64D, 64E, 64F, 64G, and 64H are respectively connected to the output terminals of the oscillating circuits 62A through 62H, and the switching circuits 66A, 66B, 66C, 66D, 66E, 66F, 66G, and 66H are respectively connected to the output terminals of the local level control circuits 64A through 66H.

Each of the level control terminals of the local level control circuits 64A through 64H is connected to the signal generating circuit 58 so that the signal which controls the above-described amplitude is inputted to each of the level control terminals thereof. As the local level control circuit, a double balanced mixer or a pin diode attenuator may be used. Further, each of the control terminals of the switching circuits 66A through 66H is connected to the delay circuit 56 so that image data outputted from the delay circuit 56 is respectively inputted to the switching circuits. The output terminals of the switching circuits 66A and 66B are connected to the input terminals of a combiner 68AB, which mixes the two signals from circuits 66A and 66B at a ratio of 1:1. Similarly, the output terminals of the switching circuits 66C and 66D are connected to the input terminals of a combiner 68CD, the output terminals of the switching circuits 66E, 66F are connected to the input terminals of a combiner 68EF and the output terminals of the switching circuits 66G and 66H are connected to the input terminal of a combiner 68GH.

The output terminal of the combiner 68AB is connected to an amplifier circuit 72AB via a total level control circuit 70AB. Similarly, the output terminal of the combiner 68CD is connected to an amplifier circuit 72CD via a total level control circuit 70CD, the output terminal of the combiner 68EF is connected to an amplifier circuit 72EF via a total level control circuit 70EF, and the output terminal of the combiner 68GH is connected to an amplifier circuit 72GH via a total level control circuit 70GH. The output terminals of the amplifier circuits 72AB and 72CD are connected to the input terminal of a combiner 74 and the output terminals of the amplifier circuits 72EF and 72GH are connected to the input terminal of a combiner 76.

The output terminals of the combiners 74 and 76 are connected to a combiner 78, the output terminal of which is connected to an amplifier circuit 80. The output terminal of the amplifier circuit 80 is connected to a transducer 17. The total level control circuits 70AB through 70GH, as well as the local level control circuits are each comprised of a double balanced mixer or a pin diode attenuator, and each level control terminal is connected to the output terminal of a DAC 54 of the control circuit 22.

Figure 4:
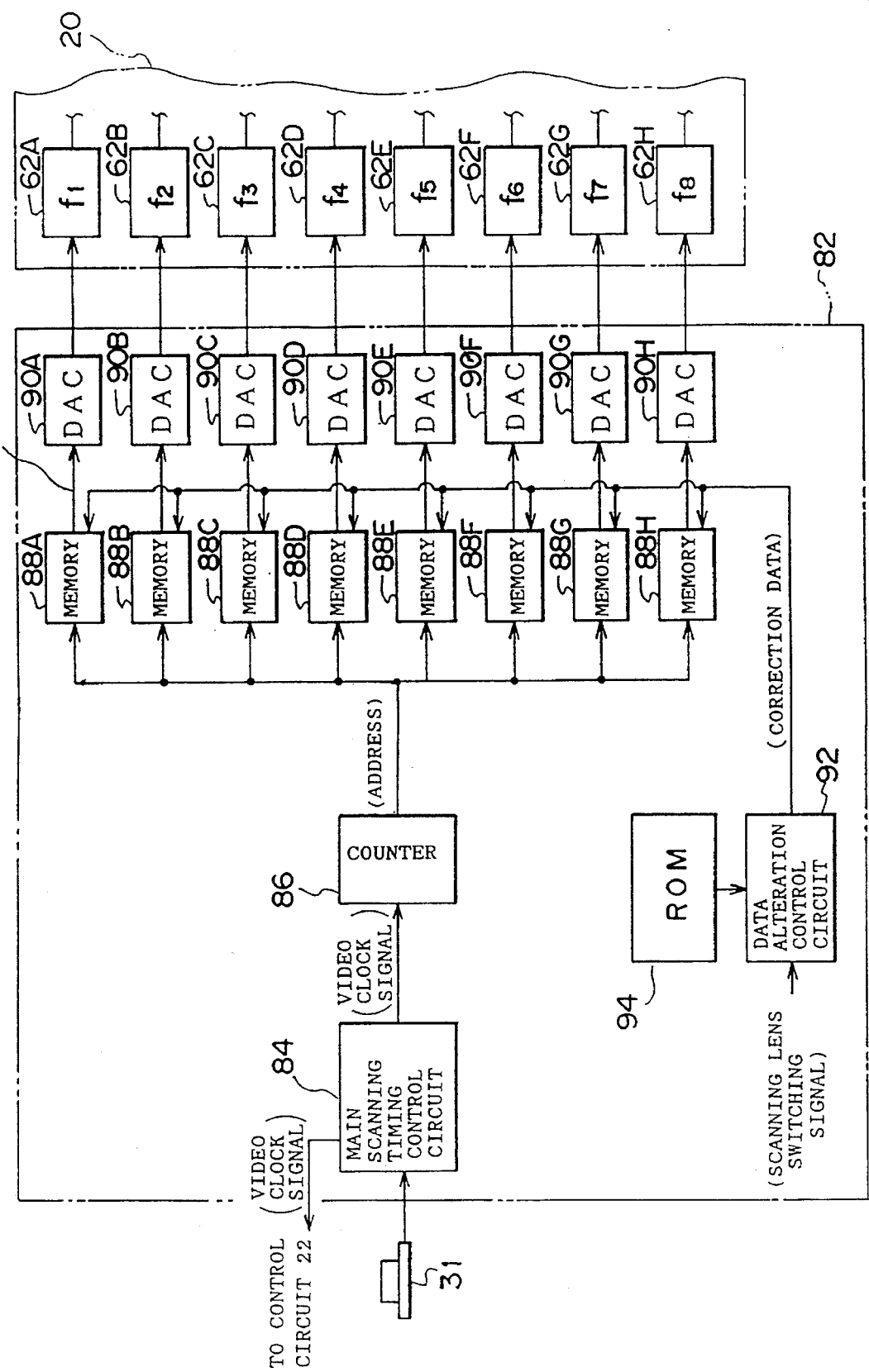
FIG. 4 is a block diagram illustrating the schematic configuration of a displacement correcting circuit according to the first embodiment.

Meanwhile, FIG. 4 illustrates that the photoelectric converter 31 is connected to a main scanning timing control circuit 84 of the displacement correcting circuit 82. The main scanning timing control circuit 84 generates, based on the pulse signal inputted from the photoelectric converter 31, a video clock signal in which each pulse occurs at the interval corresponding to a scanning rate of the laser beam in the main scanning direction. The video clock signal is supplied to the control circuit 22, by which the operation of the AOM driver 20 is controlled based on the above-described video signal so that modulation of the laser beam in AOM 18 is synchronized with scanning thereof in the main scanning direction.

The output terminal of the main scanning timing control circuit 84 is connected to a counter 86, the output terminal of which is connected to each address input terminal of memories 88A, 88B, 88C, 88D, 88E, 88F, 88G, and 88H. As memories 88A through 88H, those in which stored information is reloadable (for example, a RAM, EPROM) are used. The data output terminals of the memories 88A through 88H are respectively connected via DACs (digital-analog converter) 90A through 90H to the oscillating circuits 62A through 62H of the AOM driver 20. In addition, the data input terminals of the memories 88A through 88H are connected to a data alteration control circuit 92, to which a scanning lens switching signal is inputted when a scanning lens 40 to be used is switched. Also, ROM 94 is connected to the data alteration control circuit 92.

Next, the operation of the present embodiment will be described. Returning to FIG. 2, 8-bit image data transferred from a host computer or the like is supplied to a register 50 and the delay circuit 56. A data converter 52 outputs digital signals corresponding to the number of turned-on signals inputted from the register 50, and DAC 54 converts these digital signals to analog signals for outputting them. These analog signals are respectively inputted into the control terminals of the total level control circuits 70AB through 70GH. In addition, after the image data is delayed by the delay circuit 56 for a predetermined period of time, it is inputted into each of the switching circuits 66A through 66H of the AOM driver 20.

The oscillating circuits 62A through 62H output signals whose frequency corresponds to the voltage level of the signal supplied From the displacement correcting circuit 82. The signals outputted from the oscillating circuits 62A through 62H are supplied to the transducer 17 of the AOM 18 via the switching circuits 66A through 66H, combiners 68AB through 68GH, total level control circuits 70AB through 70GH, amplifier circuits 72AB through 72GH, combiners 74 and 76 and the combiner 78, after its amplitude is modulated by the local level control circuits 64A through 64H.

The transducer 17 converts the inputted signal into a supersonic signal having a corresponding frequency and amplitude. This supersonic signal propagates through an acoustic optical medium 21 to be absorbed by a sound absorbing material 19. At this time, if the laser beam is being oscillated from the He—Ne laser 12, then this laser beam is diffracted by the acoustic optical medium 21 in a direction corresponding to the frequency of the supersonic signal and with power corresponding to the amplitude thereof so that a plurality of laser beams is emitted. The plurality of laser beams emitted from the AOM 18 is scanned in the main scanning direction by the polygon mirror 28 and is illuminated via the scanning lens 40 on the recording material 44. Accordingly, in the present embodiment, an image can be recorded by turning a laser beam on or off.

Meanwhile, data corresponding to the voltage level of signals which are to be supplied to each of the oscillating circuits 62A through 62H is previously stored in ROM 94 for each scanning lens 40. This data includes amount for correcting the displacement of the laser beam due to the previously obtained aberration of each scanning lens 40, and it is stored so as to correspond to a position of the laser beam along the main scanning direction for being stored (see the following table 1).

TABLE 1

| Scanning Lenses | Oscillating Circuits | Positions along the Main Scanning Direction | | | | | |
|---|---|---|---|---|---|---|---|
| | | 0 | 1 | 2 | 3 | ... | X |
| A | 62A | $A_{A0}$ | $A_{A1}$ | $A_{A2}$ | $A_{A3}$ | ... | $A_{AX}$ |
| | 62B | $A_{B0}$ | $A_{B1}$ | $A_{B2}$ | $A_{B3}$ | ... | $A_{BX}$ |
| | . | . | . | . | . | ... | . |
| | . | . | . | . | . | ... | . |
| | 62H | $A_{H0}$ | $A_{H1}$ | $A_{H2}$ | $A_{H3}$ | ... | $A_{HX}$ |
| B | 62A | $B_{A0}$ | $B_{A1}$ | $B_{A2}$ | $B_{A3}$ | ... | $B_{AX}$ |
| | . | . | . | . | . | ... | . |
| | . | . | . | . | . | ... | . |

Figure 5:
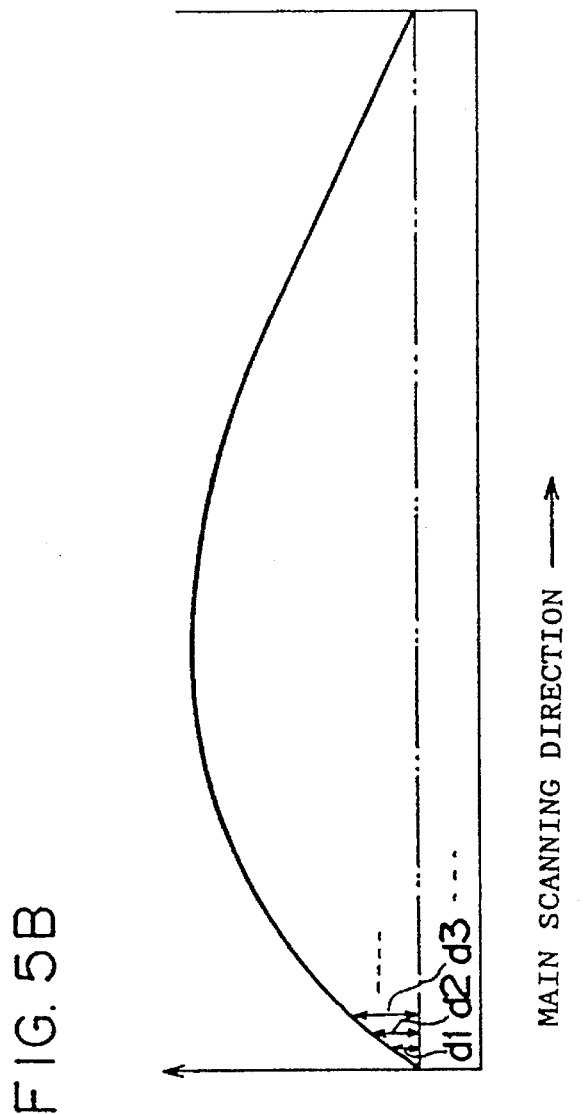
FIGS. 5A and 5B are both diagrammatic views illustrating how the displacement amount which corrects the displacement of the laser beam is derived.

The above-described data including correction amount are obtained as follows. By way of example, a signal having a reference frequency $f_1$ is outputted from the oscillating circuit 62A. When this signal is supplied to the AOM 18, the laser beam emitted from the AOM 18 in a direction corresponding to the frequency $f_1$ passes through the polygon mirror 28 and is scanned on the position of the scanning lens 40, which is indicated in FIG. 5A. Thereafter, the laser beam will be illuminated on the recording material 44. At this time, the position in which the laser beam is illuminated on the recording material 44 is displaced in a sub-scanning direction due to an aberration of the scanning lens 40, and the line of motion of the position in which the laser beam is illuminated curves, for example, as illustrated in FIG. 5B.

First, displacement amounts d1, d2, d3, . . . are measured for each predetermined interval along the main scanning direction as illustrated in FIG. 5B. Then, correction amounts $f_{d1}$, $f_{d2}$, $f_{d3}$, . . . for the reference frequency $f_1$, which displace the position in which the laser beam is illustrated by the displacement amount d1, d2, d3, are obtained by calculation. If values which are obtained by adding the reference frequency $f_1$ to each of the correction amounts $f_{d1}$, $f_{d2}$, $f_{d3}$, . . . , are converted into digital data, the data including the above-described correction amounts, which is to be supplied to the oscillating circuit 62A when the scanning lens 40 is used, are obtained. The above-described processing is carried out for the oscillating circuits 62B through 62H as well as the oscillating circuit 62A. By adding the reference frequencies $f_2$ through $f_8$ to the obtained correction amounts respectively, the data for the specified scanning lens 40 is derived. The above-described processing is carried out for each scanning lens 40 supported by a turret 41, so as to obtain the data shown in the table 1. Meanwhile, the displacement amounts d1, d2, d3, . . . can also be obtained by calculation at the stage of designing the scanning lens 40.

The data alteration control circuit 92 determines, based on the inputted scanning lens switching circuit, the scanning lens 40 to be used and stores data corresponding to the scanning lens 40 in each of memories 88A through 88H. For example, when it is determined to use the scanning lens "A" shown in the table 1, data $A_{A0}$, $A_{A1}$, $A_{A2}$, . . . , $A_{AX}$ are sequentially set from the first address of the memory 88A for being stored therein. Further, data are respectively set and stored in the memories 88B through 88H as well as the memory 88A.

When the recording of an image on the recording material 44 by the laser beam is initiated, the reference laser beam is scanned on the linear encoder 33 as the laser beam is scanned in the main scanning direction, and a video clock signal is outputted from the main scanning timing control circuit 84 in accordance with a pulse signal outputted from the photoelectric converter 31. A counter 86 counts the number of pulses of the inputted video clock signal for sequentially outputting the count value to the memories 88A through 88H. The count value corresponds to a position of the laser beam along the main scanning direction. Each of memories 88A through 88H handles the count value as an address and outputs data stored in the associated address. Accordingly, memories 88A through 88H each output data corresponding to the position of the laser beam along the main scanning direction sequentially from the first address with scanning of the laser beam in the main scanning direction. This data is supplied to DACs 90A through 90H and is converted to an analog signal whose voltage level corresponds to a data value so as to be supplied to the oscillating circuits 62A through 62H.

The oscillating circuits 62A through 62H each output a signal whose frequency corresponds to the voltage level of the supplied signal, and the AOM 18 emits the laser beam in a direction corresponding to the frequency of the signal. Therefore, the direction where the laser beam is emitted is successively altered so as to correct displacement of the laser beam caused by aberration of the scanning lens 40. As a result, the line of motion of the position where each laser beam is illuminated on the recording material 44 becomes a straight line such that it is parallel to the main scanning direction. When one main scanning of the laser beam is completed, the count value in the counter 86 is reset, and the data are again sequentially outputted from the first address of the memories 88A through 88H, so that the direction where the laser beam is emitted is successively altered in the same way as the aforementioned. Accordingly, the intervals between scanning lines become uniform and the influence of an aberration of the scanning lens 40 is eliminated.

Further, when the scanning lens 40 to be used is changed, a scanning lens switching signal is inputted to the data alteration control circuit 92 which takes in data corresponding to the changed scanning lens 40 from ROM 94 and set the data in each of memories 88A through 88H. Accordingly, since the frequency of the signal outputted from each of oscillating circuits 62A through 62H is controlled in the same way as the aforementioned in order to correct the displacement due to the aberration of the changed scanning lens 40, even though the scanning lens 40 is changed, the influence of the aberration of the scanning lens 40 is eliminated.

Meanwhile, in place of the aforementioned data, displacement amounts d1, d2, d3, ... of the laser beam may be stored in ROM 94 and memories 88A through 88H to obtain the respective correction amounts by calculation and to control the voltage level of the signals supplied to the oscillating circuits 62A through 62H.

[Second Embodiment]

A second embodiment of the present invention will be described hereinafter. Structural portions of the second embodiment which are the same as those in the first embodiment will be denoted with the same reference numerals, and description thereof will be omitted.

Figure 6:
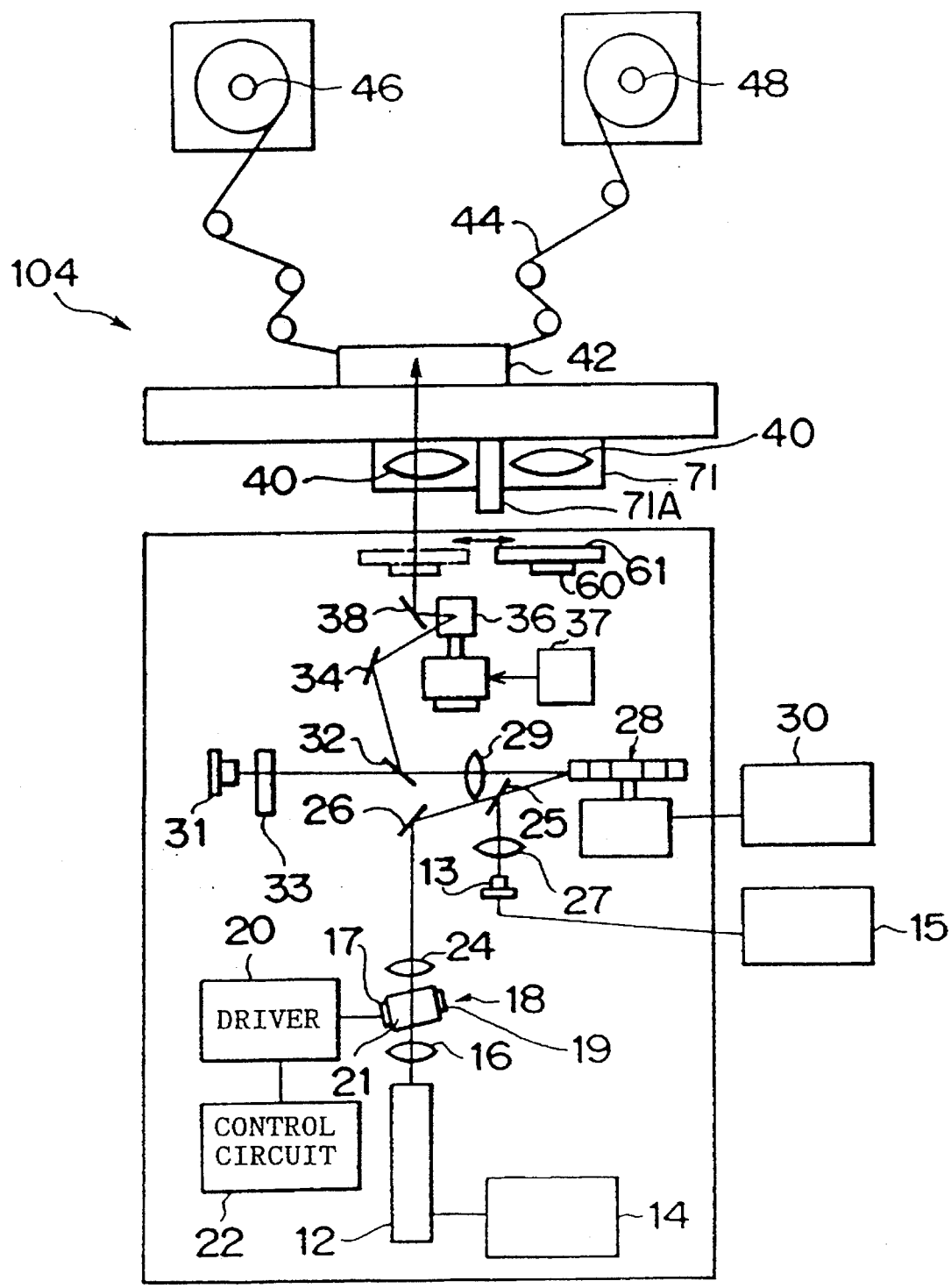
FIG. 6 is a schematic block diagram illustrating a laser beam recording apparatus according to a second embodiment of the present invention.

FIG. 6 illustrates a laser beam recording apparatus 104 according to the second embodiment, in which a mirror 34, a galvanometer mirror 36, and a mirror 38 are sequentially arranged at the upper side of a dichroic mirror 32. A recording laser beam reflected off of the dichroic mirror 32 is reflected off of the mirror 34 and in turn is incident on the galvanometer mirror 36, to which a galvanometer mirror driver 37 is connected.

Figure 7:
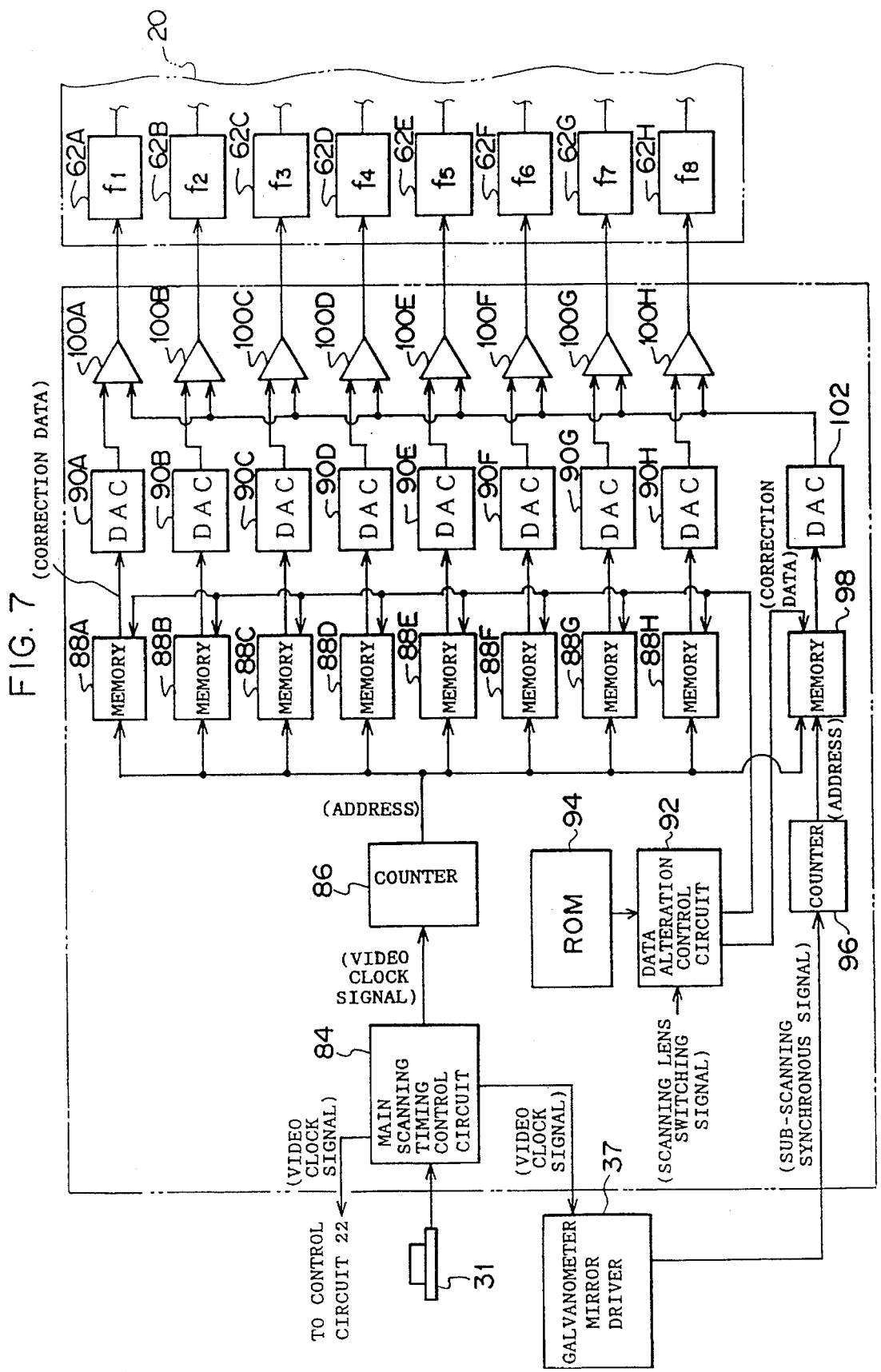
FIG. 7 is a block diagram illustrating the schematic configuration of a displacement correcting circuit according to the second embodiment.

As illustrated in FIG. 7, a video clock signal outputted from the main scanning timing control circuit 84 is inputted to the galvanometer mirror driver 37 which outputs a drive signal which synchronizes driving of the galvanometer mirror 36 with scanning of the laser beam in the main scanning direction. The galvanometer mirror 36 rotates its mirror in accordance with the inputted drive signal to cause the incident laser beam to be scanned in the sub-scanning direction. The laser beam emitted from the galvanometer mirror 36 is reflected off of a mirror 38 and in turn is illuminated via the scanning lens 40 on the recording material 44. Meanwhile, as the laser beam is scanned along the sub-scanning direction by the galvanometer mirror 36, the position on the scanning lens 40, where each laser beam is scanned will move along the sub-scanning direction.

FIG. 7 illustrates that a counter 96 is connected to the galvanometer mirror driver 37 which outputs to the counter 96 a sub-scanning synchronous signal in which each pulse occurs at the interval corresponding to a scanning rate of the laser beam in the sub-scanning direction to the counter 96. The output terminal of the counter 96 is connected to one of two address input terminals of a memory 98 serving as a two-dimensional memory such as a frame memory or the like. The other address input terminal of the memory 98 is connected to the output terminal of a counter 86. Memory 98 will output corresponding data by inputting each address via two address input terminals. Further, the output terminals of DACs 90A through 90H are connected to one of two input terminals of adders 100A through 100H, and the output terminal of the memory 98 is connected via DAC 102 to the other input terminals of the adders 100A through 100H. The output terminals of the adders 100A through 100H are connected to the oscillating circuits 62A through 62H.

Next, the operation of the second embodiment will be described. In addition to the data described in the first embodiment, data to be stored in a memory 98 are also stored in ROM 94 for each scanning lens 40. This data represents the correction amount for correcting the displacement of the laser beam, which varies in accordance with the sub-scanning of the laser beam. The data is stored so as to correspond to the positions of the laser beam along the main scanning direction and along the sub-scanning direction, as shown in the following table 2.

TABLE 2

| | | Main Scanning Direction Positions | | | | |
|---|---|---|---|---|---|---|
| | | 0 | 1 | 2 | ... | X |
| Sub-Scanning Direction Positions | 0 | $A_{00}$ | $A_{10}$ | $A_{20}$ | ... | $A_{X0}$ |
| | 1 | $A_{01}$ | $A_{11}$ | $A_{21}$ | ... | $A_{X1}$ |
| | 2 | $A_{02}$ | $A_{12}$ | $A_{22}$ | ... | $A_{X2}$ |
| | . | . | . | . | ... | . |
| | . | . | . | . | ... | . |
| | Y | $A_{0Y}$ | $A_{1Y}$ | $A_{2Y}$ | ... | $A_{XY}$ |

When the recording of images by the laser beam is initiated, the counter 86 outputs a count value which increases in accordance with the movement of the laser beam along the main scanning direction and data stored in an address corresponding to the inputted count value are sequentially outputted from memories 88A through 88H. The data outputted from memories 88A through 88H are converted into analog signals in DACs 90A through 90H. Further, the counter 96 outputs a count value which increases in accordance with the movement of the laser beam in the sub-scanning direction. Data stored in each address corresponding to the count value inputted from the counter 86 and the count value inputted from the counter 96 are outputted from the memory 98 and in turn are converted into analog signals in DAC 100.

The analog signals outputted from DACs 90A through 90H are, including the analog signals outputted from DAC 102 by adders 100A through 100H, outputted to the oscillating circuits 62A through 62H, from which signals having a frequency which corresponds to the voltage level of the inputted signals are outputted. Accordingly, since the frequency of the signals which are outputted from the oscillating circuits 62A through 62H is altered so as to correct variation of the displacement amount caused as the laser beam is moved along the main scanning direction and so as to correct variation of the displacement amount caused as the laser beam is moved along the sub-scanning direction, the intervals between scanning lines become uniform and the curve of the laser beam due to the aberration of the scanning lens 40 is corrected.

Figure 8:
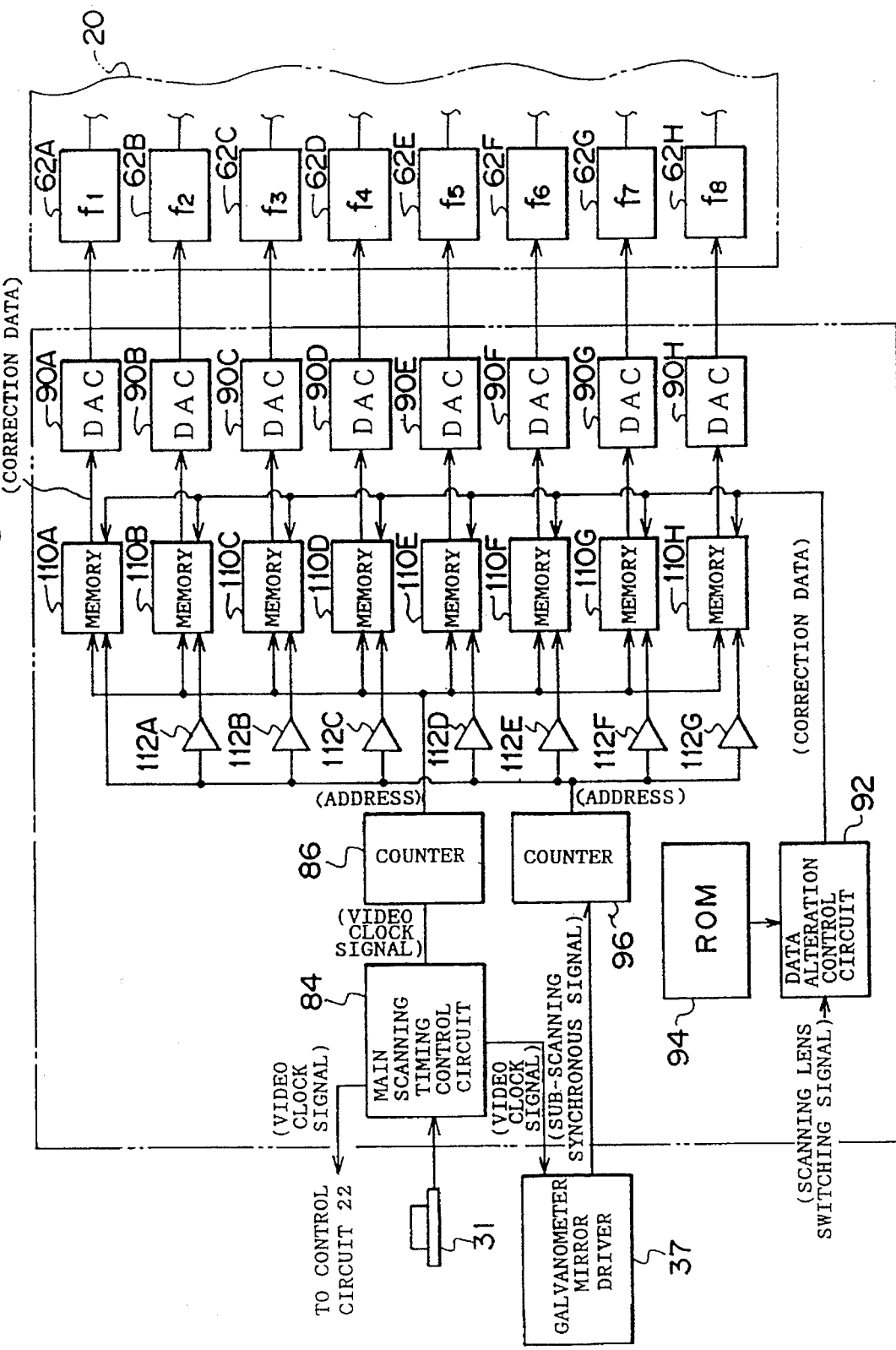
FIG. 8 is a block diagram illustrating the schematic configuration of a displacement correcting circuit of an alternative embodiment.

Meanwhile, the displacement correcting circuit 82 may be constructed, for example, as illustrated in FIG. 8. Namely, FIG. 8 illustrates that, in place of memories 88A through 88H, two-dimensional memories 110A through 110H with the same construction of memory 98 are employed. Further, the output terminal of the counter 96 which counts a sub-scanning synchronous signal is connected to an address input terminal of the memory 110A and is also connected to the address input terminals of the memories 110B through 110H via adders 112A through 112G. Based on the position where the laser beam emitted in accordance with the signal outputted from the oscillating circuit 62A is illuminated, adders 112A through 112G will add a fixed value corresponding to the interval (i.e., the interval between scanning lines) along the sub-scanning direction with respect to the reference position where the laser beam is illuminated.

When an image is recorded on the recording material 44, data which represents the positions of corresponding laser beams in the main scanning direction and in the sub-scanning direction is given as an address in each of memories 110A through 110H and the corresponding data is outputted. In the displacement correcting circuit 82 shown in FIG. 7, variation of the displacement amount caused by scanning in the sub-scanning direction is corrected by means of the same correction amount for each laser beam. However, in the displacement correcting circuit 82 of FIG. 8, since the correction amount for each laser beam can be varied in accordance with the position of the laser beam in the sub-scanning direction, variation of the displacement amount of the laser beam caused by scanning the laser beam in the sub-scanning direction can be more strictly corrected.

[Third Embodiment]

A third embodiment of the present invention will be described hereinafter. Structural portions of the third embodiment which are the same as those in the first and second embodiments will be denoted with the same reference numerals, and description thereof will be omitted.

Figure 9:
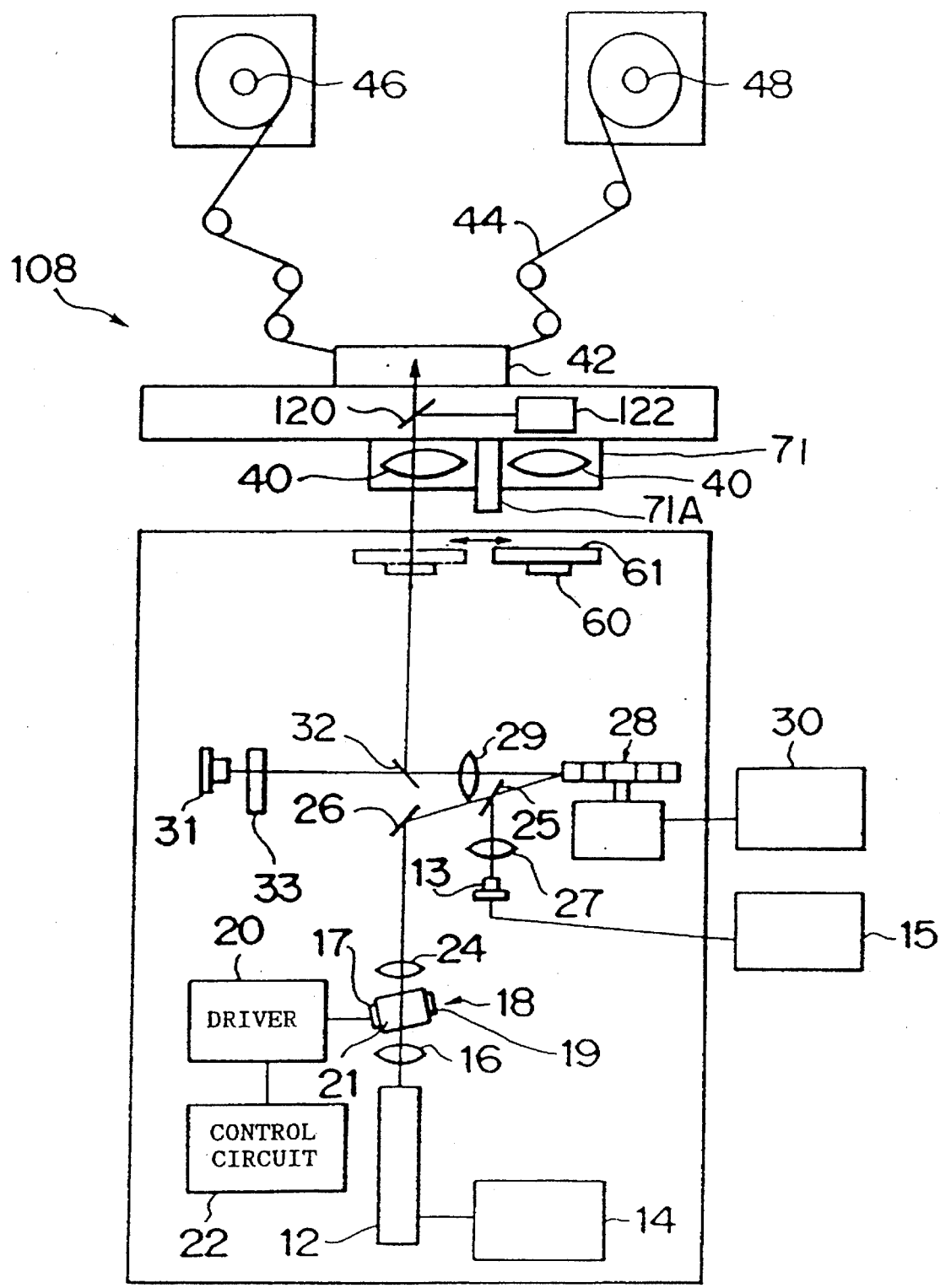
FIG. 9 is a schematic block diagram illustrating a laser beam recording apparatus according to a third embodiment of the present invention.

FIG. 9 illustrates a laser beam recording apparatus 108 of the third embodiment in which, as well as the laser beam recording apparatus 10 of the first embodiment, the laser beam is scanned only in the main scanning direction and the position where the laser beam is illuminated is moved in the sub-scanning direction by conveying the recording material 44. Further, a half mirror 120 which reflects a part of the laser beam passing through the scanning lens 40 is disposed between the scanning lens 40 and a stage 42. On the side of the half-mirror 120 where the laser beam is reflected, a displacement amount detector 122 is provided.

Figure 10:
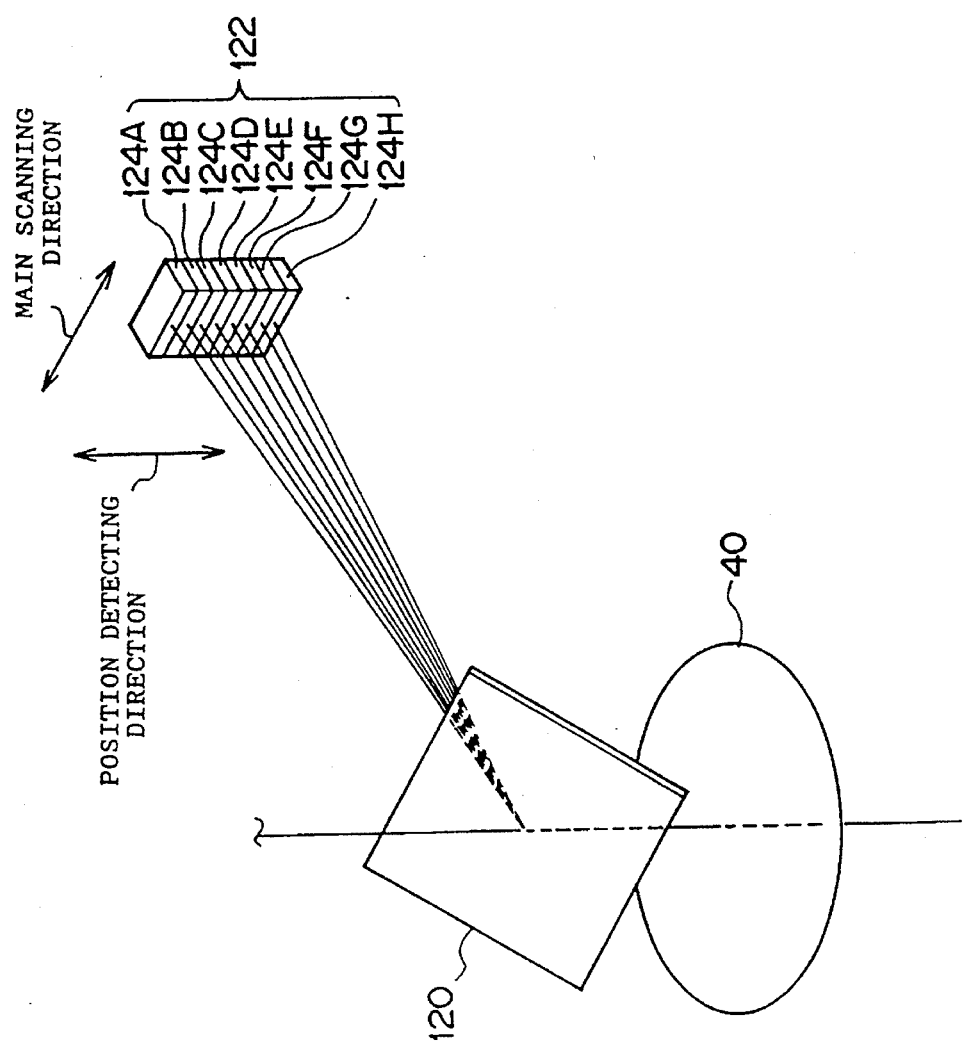
FIG. 10 is a perspective view illustrating the configuration of a displacement amount detector according to the third embodiment.

FIG. 10 illustrates that the displacement amount detector 122 is comprised of eight semiconductor position sensitive detectors (PSDs) 124A through 124H. PSD is an element which generates voltage whose level corresponds to a position where light is illuminated. In the present embodiment, PSDs 124A through 124H are disposed so as to correspond to eight laser beams emitted from AOM 18 and so as to cause their position detecting directions to be perpendicular to the main scanning direction of the laser beam. Further, since the position where the laser beam is illuminated moves along the main scanning direction, the dimension of a light-receiving surface of each PSD along the main scanning direction is enlarged so that the position where the laser beam is illuminated is not deviated from the light-receiving surface.

Figure 11:
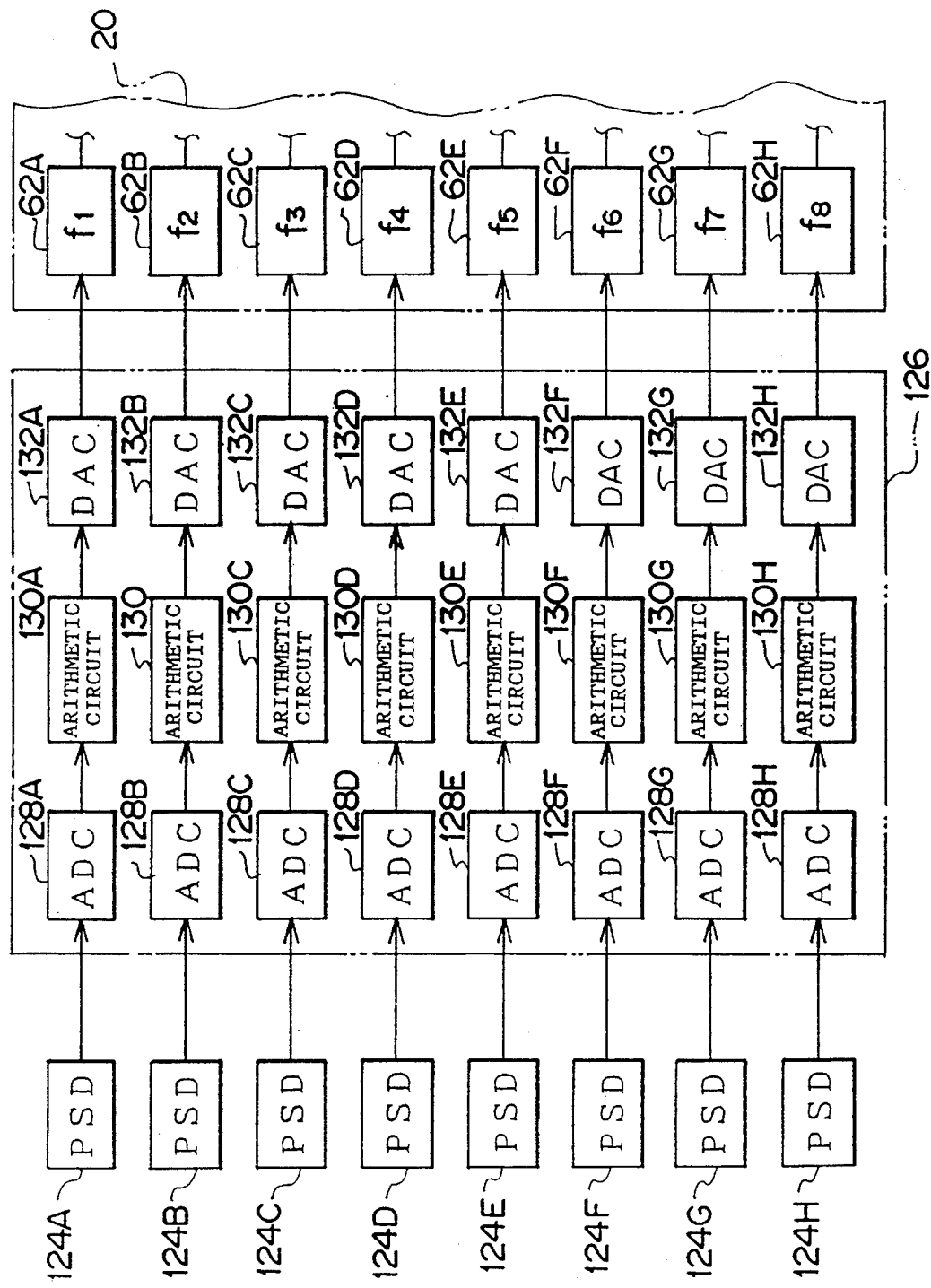
FIG. 11 is a block diagram illustrating the schematic configuration of a displacement correcting circuit according to the third embodiment.

FIG. 11 illustrates that PSDs 124A through 124H are connected to the input terminals of ADCs (analog-digital converters) 128A through 128H of a displacement correcting circuit 126. The output terminals of ADCs 128A through 128H are connected to the input terminals of arithmetic circuits 130A through 130H, of which output terminals are connected to the input terminals of the DACs 132A through 132H. The output terminals of DACs 132A through 132H are connected to the oscillating circuits 62A through 62H of the AOM driver 20.

Next, the operation of the third embodiment will be described. When the recording of images by the laser beam is initiated, a plurality of laser beams emitted from AOM 18 is scanned along the main scanning direction on the polygon mirror 28 and in turn is Illuminated via the scanning lens 40 and the half mirror 120 onto the recording material 44. Further, a part of the laser beam which passed through the scanning lens 40 is reflected off of the half mirror 120 and is incident on PSDs 124A through 124H of the displacement amount detector 122, respectively. PSDs 124A through 124H each output a signal whose voltage level corresponds to the position where the laser beam is illuminated along the direction perpendicular to the main scanning direction, i.e., the displacement amount.

Signals outputted from PSDs 124A through 124H are converted by ADCs 128A through 128H to digital data of which the value corresponds to the voltage level. Arithmetic circuits 130A through 130H incorporate the data converted by ADCs 128A through 128H for each predetermined period of time and compare the incorporated data with the preset reference data. This reference data is the value equal to the data which is inputted when the displacement amount of the laser beam is zero. The frequency correction amount for correcting the difference between the incorporated data and the reference data is calculated and the calculated correction amount is added to the reference frequency ($f_1$ through $f_8$) and in turn is outputted to DACs 132A through 132H. Data outputted from the arithmetic circuits 130A through 130H are converted by DACs 132A through 132H to analog signals whose voltage level corresponds to the data value and in turn are respectively outputted to the oscillating circuits 62A through 62H.

Accordingly, since the frequency of the signals outputted from the oscillating circuits 62A through 62H is altered so as to correct the displacement amount of the laser beam for each predetermined period of time, the displacement of the laser beam due to an aberration of the scanning lens 40 is corrected and the influence of the aberration of the scanning lens 40 is eliminated. Further, even if the displacement of the laser beam occurs due to environmental variation or the like, the displacement amount is detected by PSDs 124A through 124H, so that the aforementioned correction is achieved.

Meanwhile, in the foregoing, the case of scanning a plurality of laser beams was described as an example. However, the present Invention is not limited to the same, and may be applied to the case of scanning one laser beam. In this case, it is possible to correct the curve of a scanning line at the time of recording an image by one laser beam. Especially, there is a remarkable effect when an image is recorded at high density. Further, although the optical beam scanning apparatus in which the laser beam is used as an optical beam was described as an example, the present invention is also applicable to a scanning apparatus using LED light or light from other light sources as the optical beam.

Also, although the case in which a laser beam is used in the recording apparatus was described in the above-described embodiment, the present invention is easily applicable to a scanning apparatus for performing reading.

In addition, although, in the present embodiment, an acoustic optical element is used as the light modulator, the present invention is not limited to the same and an AOD (acoustic optical deflector) or the like may be also used as the light modulator.

As described above, according to the present invention, since information for correcting the displacement of an optical beam which has passed through a scanning lens due to an aberration of the scanning lens is stored so as to correspond to the position of the optical beam along the main scanning direction, and based on the stored information the frequency of a signal to be inputted to an optical modulator is altered in accordance with the position of the optical beam along the main scanning direction so that the displacement of the optical beam caused by the aberration of the scanning lens is corrected, the influence of the aberration of the scanning lens can be eliminated.

Further, as described above, according to the present invention, since the displacement amount of an optical beam passing through a scanning lens which is caused by an aberration of the scanning lens is detected and the Frequency of a signal to be inputted to an optical modulator is altered so as to correct the displacement amount of the optical beam, the influence of the aberration of the scanning lens can be eliminated.

What is claimed is:

1. An optical beam scanning apparatus comprising:
   an optical modulator which emits an incident optical beam in a direction corresponding to a frequency of an input signal;

scanning means for scanning the optical beam emitted from said optical modulator;

a scanning lens through which the optical beam scanned by said scanning means passes;

storage means for storing data, for each of a plurality of scanning positions, for correcting displacement of the optical beam passing through the scanning lens, said displacement being caused by aberration of said scanning lens; and alteration means for altering, based on the data stored in said storage means, the frequency of the signal to be inputted to said optical modulator for each of said scanning positions of the optical beam so as to correct the displacement of the optical beam caused by aberration of the scanning lens.

2. An optical beam scanning apparatus according to claim 1, wherein the scanning means scans the optical beam in a main scanning direction.

3. An optical beam scanning apparatus according to claim 2, wherein said storage means stores data for correcting the displacement of the optical beam for each of said positions in which the optical beam is illuminated along the main scanning direction, and said alteration means alters the input signal frequency based on the data for each of said positions in which the optical beam is illuminated along the main scanning direction.

4. An optical beam scanning apparatus according to claim 1, wherein said scanning means scans the optical beam along the main scanning direction and a sub-scanning direction.

5. An optical beam scanning apparatus according to claim 4, wherein said storage means stores data for correcting the displacement of the optical beam for each of said positions in which the optical beam is illuminated along the main scanning direction and the sub-scanning direction, and said frequency alteration means alters the input signal frequency based on the data for each of said positions in which the optical beam is illuminated along the main scanning direction and the sub-scanning direction.

6. An optical beam scanning apparatus according to claim 4, wherein said scanning means has a rotating polygon mirror as a main direction scanning means and a galvanometer mirror as a sub-direction scanning means.

7. An optical beam scanning apparatus according to claim 1, wherein said scanning means is a rotating polygon mirror.

8. An optical beam scanning apparatus according to claim 1, wherein the data for correcting the displacement of the optical beam is the displacement amount of the optical beam itself caused by the aberration of said scanning lens, and said alternation means includes an arithmetic circuit for calculating a correction amount from the displacement amount.

9. An optical beam scanning apparatus according to claim 1, further comprising a controller that alters the data stored in said storage means to data corresponding to a variation of a relationship between a position on the scanning lens where said optical beam passes through and the displacement amount of the optical beam, when said variation occurs.

10. An optical beam scanning apparatus according to claim 1, wherein said optical modulator includes an acoustic optical element and an oscillating circuit.

11. An optical beam scanning apparatus according to claim 1, wherein said input signal comprises a plurality of frequencies.

* * * * *